United States Patent
Guilani

(10) Patent No.: US 9,994,423 B2
(45) Date of Patent: Jun. 12, 2018

(54) RESURFACING OF BELT FOR ELEVATOR SYSTEM

(71) Applicant: OTIS ELEVATOR COMPANY, Farmington, CT (US)

(72) Inventor: Brad Guilani, Woodstock Valley, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days. days.

(21) Appl. No.: 15/037,538

(22) PCT Filed: Nov. 22, 2013

(86) PCT No.: PCT/US2013/071474
§ 371 (c)(1),
(2) Date: May 18, 2016

(87) PCT Pub. No.: WO2015/076827
PCT Pub. Date: May 28, 2015

(65) Prior Publication Data
US 2016/0297644 A1 Oct. 13, 2016

(51) Int. Cl.
*B66B 7/12* (2006.01)
*B66B 7/06* (2006.01)
(Continued)

(52) U.S. Cl.
CPC ............... *B66B 7/12* (2013.01); *B29C 59/04* (2013.01); *B29D 29/06* (2013.01); *B66B 7/06* (2013.01);
(Continued)

(58) Field of Classification Search
CPC .. B66B 7/12; B66B 7/06; B29C 59/04; B29D 29/06
See application file for complete search history.

(56) References Cited

U.S. PATENT DOCUMENTS 4,211,743 A * 7/1980 Nauta ..................... B29C 51/22
264/284
4,224,601 A * 9/1980 Davidson ............... G01D 15/06
347/161
(Continued)

FOREIGN PATENT DOCUMENTS

CN 1623884 A 6/2005
CN 1925951 A 3/2007
(Continued)

OTHER PUBLICATIONS

Notification of Transmittal of the International Search Report and the Written Opinion of the International Searching Authority, or the Declaration; Application No. PCT/US2013/071474; dated Aug. 21, 2014; 13 pages.
(Continued)

*Primary Examiner* — Michael A Riegelman
(74) *Attorney, Agent, or Firm* — Cantor Colburn LLP

(57) ABSTRACT

A resurfacer for a belt of an elevator system includes a resurfacing roller having a selected surface roughness and a heater element to heat the belt to a selected temperature. A biasing element urges the resurfacing roller into contact with the belt and applies a selected pressure to the belt. A method for altering a surface roughness of a belt of an elevator system includes positioning a resurfacing roller having a selected surface roughness at an outer surface of the belt and heating the belt to a selected temperature. A selected pressure is applied to the belt via the resurfacing roller. The belt is passed along the resurfacing roller and the surface roughness of the belt is altered via the resurfacing roller.

12 Claims, 8 Drawing Sheets

(51) Int. Cl.
  *B29C 59/04*   (2006.01)
  *B29D 29/06*   (2006.01)
  *B29K 21/00*   (2006.01)
  *B29L 29/00*   (2006.01)
(52) U.S. Cl.
  CPC ..... *B29K 2021/003* (2013.01); *B29L 2029/00* (2013.01)

(56) References Cited

U.S. PATENT DOCUMENTS

| | | | | |
|---|---|---|---|---|
| 5,792,262 | A * | 8/1998 | Bohn | B41F 27/02 101/389.1 |
| 7,926,649 | B2 * | 4/2011 | Goser; Hubert | B29C 43/22 187/251 |
| 8,052,820 | B2 * | 11/2011 | O'Donnell | B32B 3/08 156/179 |
| 2005/0115799 | A1 | 6/2005 | Ach et al. | |
| 2007/0014886 | A1 * | 1/2007 | Hennessey | B29C 43/222 425/471 |
| 2008/0156592 | A1 * | 7/2008 | Thompson | B29C 59/02 187/411 |
| 2010/0040837 | A1 * | 2/2010 | Planeta | B29C 55/06 428/187 |
| 2011/0088981 | A1 | 4/2011 | Urbani et al. | |
| 2017/0073195 | A1 * | 3/2017 | Eastman | B29C 73/02 |

FOREIGN PATENT DOCUMENTS

| | | |
|---|---|---|
| CN | 101115631 A | 1/2008 |
| CN | 102006988 A | 4/2011 |
| CN | 102627206 A | 8/2012 |
| CN | 103171936 A | 6/2013 |
| JP | 2010095350 A | 4/2010 |
| JP | 2011026027 A | 2/2011 |
| WO | 2012128753 A1 | 9/2012 |
| WO | 2013139659 A1 | 9/2013 |

OTHER PUBLICATIONS

EP Extended Search Report; Application No. EP 13897871.3; dated Jul. 28, 2017; 6 pages.
Chinese Office Action Issued in CN Application No. 201380081099.6, dated Jan. 11, 2018, 7 Pages.

* cited by examiner

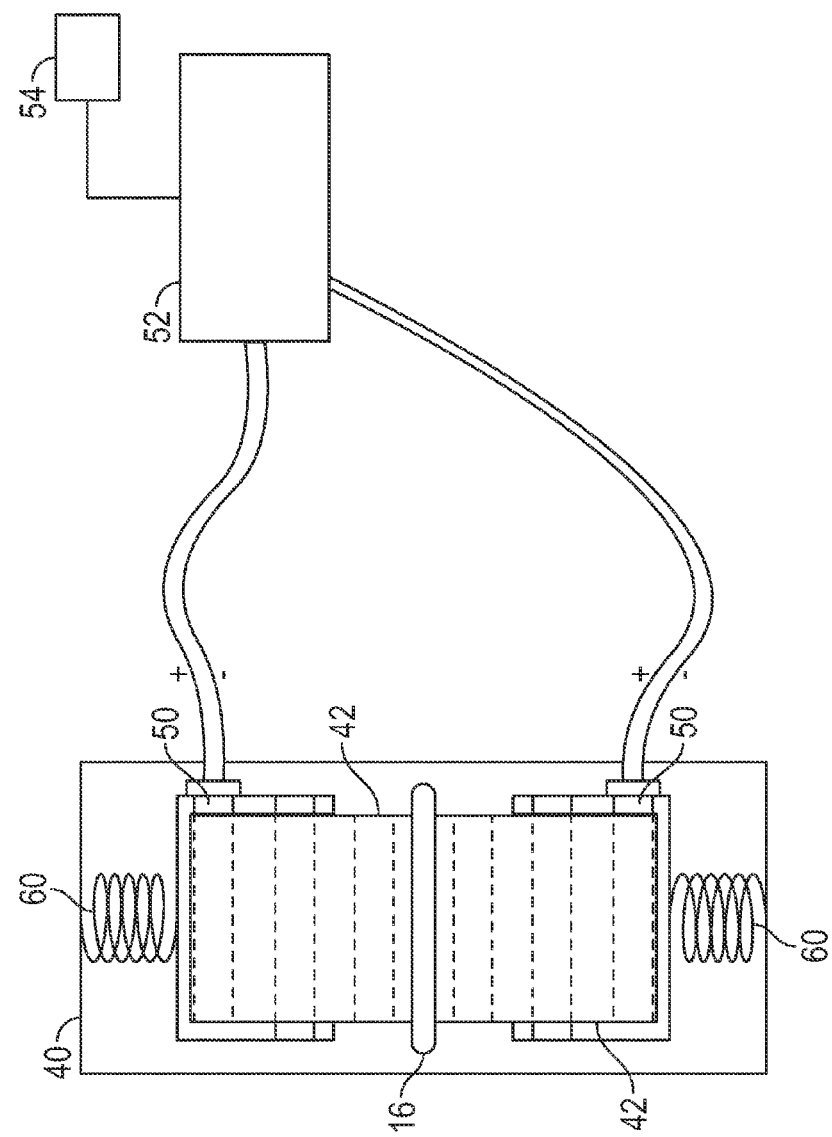

RESURFACING OF BELT FOR ELEVATOR SYSTEM

BACKGROUND

The subject matter disclosed herein relates to elevator systems suspended by belts.

Elevator systems utilize belts, for example, coated steel belts, operably connected to an elevator car, and driven by a motor to propel the elevator car along a hoistway. Coated steel belts in particular include a plurality of wires located at least partially within a jacket material, for example a thermoplastic elastomer (TPE) material. The plurality of wires is often arranged into one or more strands and the strands are then arranged into one or more cords. In an exemplary belt construction, a plurality of cords is typically arranged equally spaced within a jacket in a widthwise direction. The motor drives a sheave, in this case a traction sheave, over which the belt is routed. The belt gains traction at the traction sheave, such that rotation of the traction sheave consequently drives movement of the elevator car.

One of the characteristics of the jacket, which allows for smooth operation of the elevator system, and a desired amount of traction over the traction sheave is a surface roughness of the jacket material. Wear of the belt and jacket material over time alters the surface roughness of the jacket, smoothing the jacket surface, altering traction, noise and ride quality of the elevator system.

BRIEF DESCRIPTION

In one embodiment, a resurfacer for a belt of an elevator system including a resurfacing roller having a selected surface roughness and a heater element to heat the belt to a selected temperature. A biasing element urges the resurfacing roller into contact with the belt and applies a selected pressure to the belt. Applying the resurfacing roller to the heated belt at the selected pressure alters a surface finish of the belt.

Alternatively or additionally in this or other embodiments the resurfacer is fixed at a hoistway of the elevator system and the belt passes through the resurfacer.

Alternatively or additionally in this or other embodiments, the heater element is one or more heater rods positioned at the resurfacing roller to heat the belt to the selected temperature.

Alternatively or additionally in this or other embodiments, the selected temperature is in the range of 140 to 180 degrees Celsius.

Alternatively or additionally in this or other embodiments, the selected pressure is in the range of 20 to 50 psi.

Alternatively or additionally in this or other embodiments, the biasing member is a spring.

Alternatively or additionally in this or other embodiments, the resurface includes at least two opposing resurfacing rollers.

In another embodiment, an elevator system includes an elevator car, a motor, and a traction sheave operably connected to the motor to drive rotation of the traction sheave. A belt is operably connected to the elevator car. The belt is in frictional contact with the traction sheave such that rotation of the traction sheave urges movement of the elevator car. A resurfacer for the belt includes a resurfacing roller having a selected surface roughness, and a heater element to heat the belt to a selected temperature. A biasing element urges the resurfacing roller into contact with the belt and applies a selected pressure to the belt. Applying the resurfacing roller to the heated belt at the selected pressure alters a surface finish of the belt.

Alternatively or additionally in this or other embodiments the resurfacer is fixed at a hoistway of the elevator system and the belt passes through the resurfacer.

Alternatively or additionally in this or other embodiments, the heater element is one or more heater rods positioned at the resurfacing roller to heat the belt to the selected temperature.

Alternatively or additionally in this or other embodiments, the selected temperature is in the range of 140 to 180 degrees Celsius.

Alternatively or additionally in this or other embodiments, the selected pressure is in the range of 20 to 50 psi.

Alternatively or additionally in this or other embodiments, the belt is coated with a thermoplastic elastomer.

Alternatively or additionally in this or other embodiments, the resurfacer alters the surface roughness of the thermoplastic elastomer.

In another embodiment, a method for altering a surface roughness of a belt of an elevator system includes positioning a resurfacing roller having a selected surface roughness at an outer surface of an elevator belt and heating the elevator belt to a selected temperature. A selected pressure is applied to the elevator belt via the resurfacing roller. The elevator belt is passed between the two or more resurfacing rollers and the surface roughness of the elevator belt is altered via the application of the heated resurfacing rollers to the elevator belt at the selected pressure.

Alternatively or additionally in this or other embodiments, method is performed while the belt remains installed to the elevator system.

Alternatively or additionally in this or other embodiments, a resultant surface roughness of the belt is equal to the surface roughness of the two or more resurfacing rollers.

Alternatively or additionally in this or other embodiments, the belt is heated via one or more heater rods disposed at the resurfacing roller.

Alternatively or additionally in this or other embodiments, the selected temperature is in the range of 140 to 180 degrees Celsius.

Alternatively or additionally in this or other embodiments, the selected pressure is in the range of 20 to 50 psi.

BRIEF DESCRIPTION OF THE DRAWINGS

FIG. 6 is another cross-sectional view of an embodiment of a belt resurfacer for an elevator system.

The detailed description explains the invention, together with advantages and features, by way of examples with reference to the drawings.

DETAILED DESCRIPTION

Figure 1A:
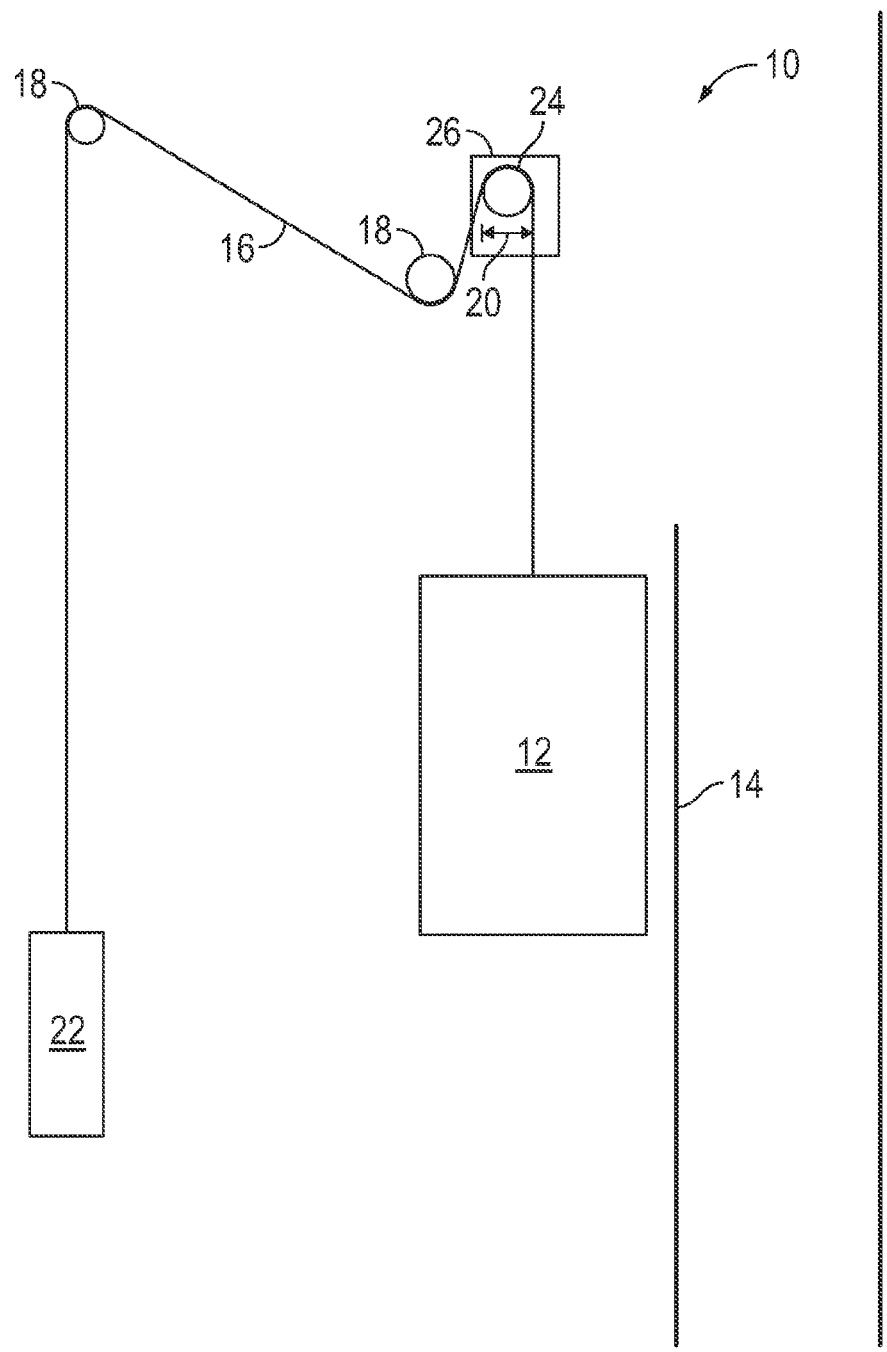
FIG. 1A is a schematic of an exemplary elevator system having a 1:1 roping arrangement.
Figure 1B:
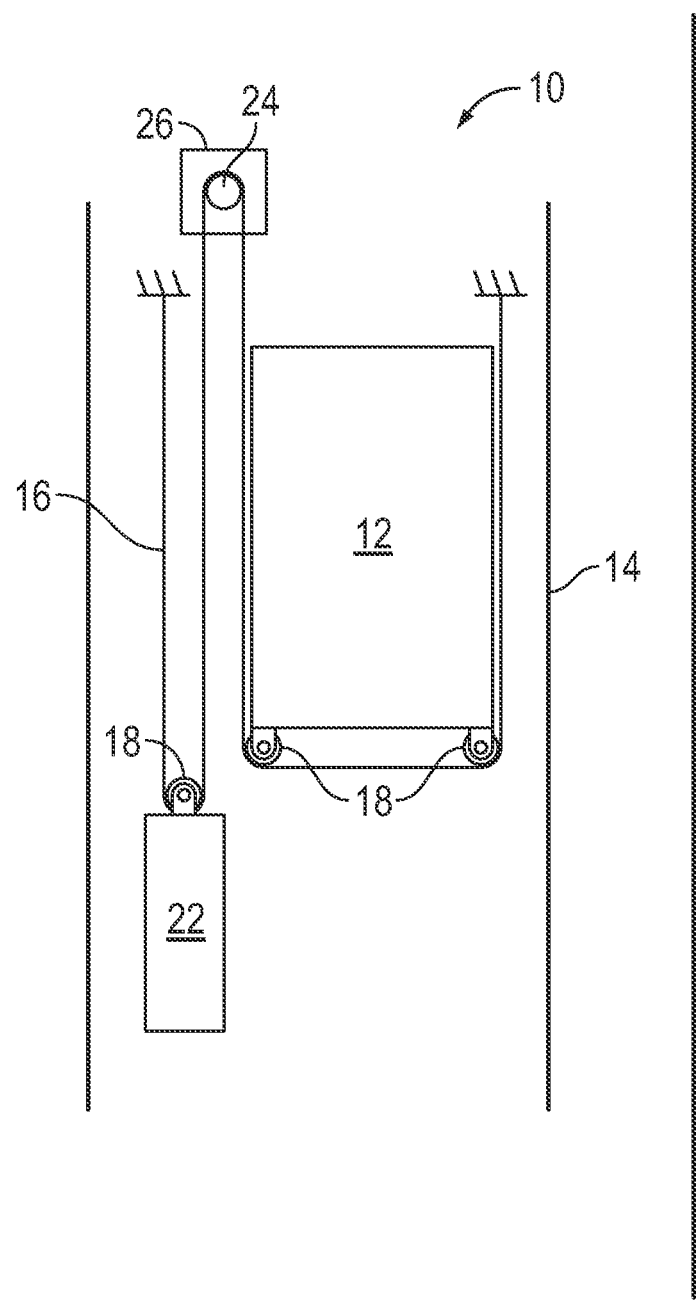
FIG. 1B is a schematic of another exemplary elevator system having a different roping arrangement.
Figure 1C:
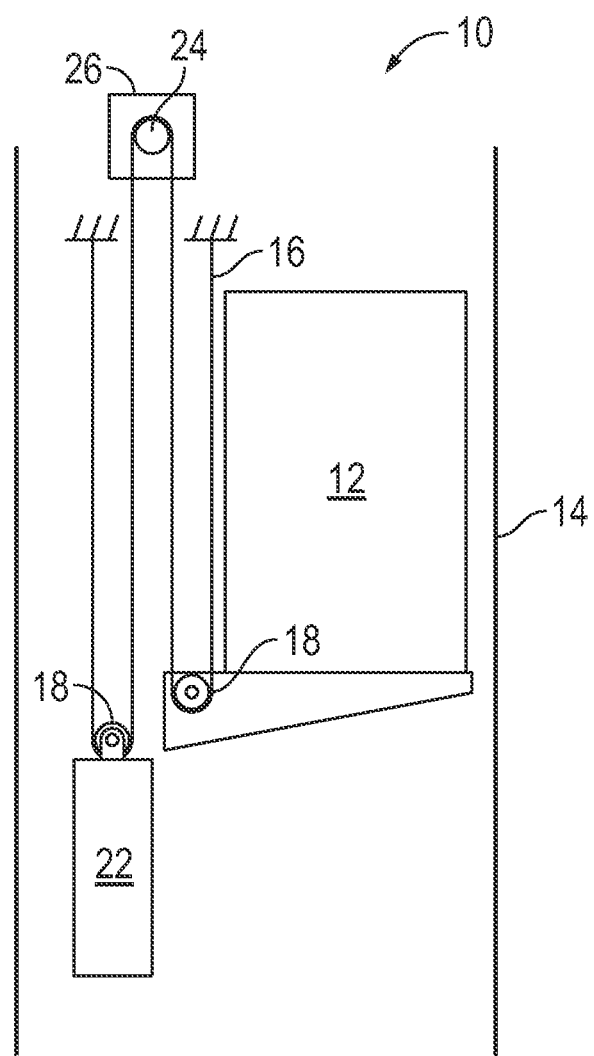
FIG. 1C is a schematic of another exemplary elevator system having a cantilevered arrangement.

Shown in FIGS. 1A, 1B and 1C are schematics of exemplary traction elevator systems 10. Features of the elevator system 10 that are not required for an understanding of the present invention (such as the guide rails, safeties, etc.) are not discussed herein. The elevator system 10 includes an elevator car 12 operatively suspended or supported in a hoistway 14 with one or more belts 16. The one or more belts 16 interact with one or more deflector sheaves 18 to be routed around various components of the elevator system 10. The one or more belts 16 could also be connected to a counterweight 22, which is used to help balance the elevator system 10 and reduce the difference in belt tension on both sides of the traction sheave during operation. It is to be appreciated that while the embodiments herein are described as applied to coated steel belts, it is to be appreciated that the disclosure herein may similarly be applied to steel ropes, either coated or uncoated.

The deflector sheaves 18 each have a diameter 20, which may be the same or different than the diameters of the other deflector sheaves 18 in the elevator system 10. At least one of the sheaves could be a traction sheave 24. The traction sheave 24 is driven by a machine 26. Movement of the traction sheave 24 by the machine 26 drives, moves and/or propels (through traction) the one or more belts 16 that are routed around the traction sheave 24.

In some embodiments, the elevator system 10 could use two or more belts 16 for suspending and/or driving the elevator car 12. In addition, the elevator system 10 could have various configurations such that either both sides of the one or more belts 16 engage the one or more deflector sheaves 18 (such as shown in the exemplary elevator systems in FIG. 1A, 1B or 1C) or only one side of the one or more belts 16 engages the one or more sheaves 18.

FIG. 1A provides a 1:1 roping arrangement in which the one or more belts 16 terminate at the car 12 and counterweight 22. FIGS. 1B and 1C provide different roping arrangements. Specifically, FIGS. 1B and 1C show that the car 12 and/or the counterweight 22 can have one or more deflector sheaves 18 thereon engaging the one or more belts 16 and the one or more belts 16 can terminate elsewhere, typically at a structure within the hoistway 14 (such as for a machineroomless elevator system) or within the machine room (for elevator systems utilizing a machine room). The number of deflector sheaves 18 used in the arrangement determines the specific roping ratio (e.g., the 2:1 roping ratio shown in FIGS. 1B and 1C or a different ratio). FIG. 1C also provides a cantilevered type elevator. The present invention could be used on elevator systems other than the exemplary types shown in FIGS. 1A, 1B and 1C.

Figure 2:
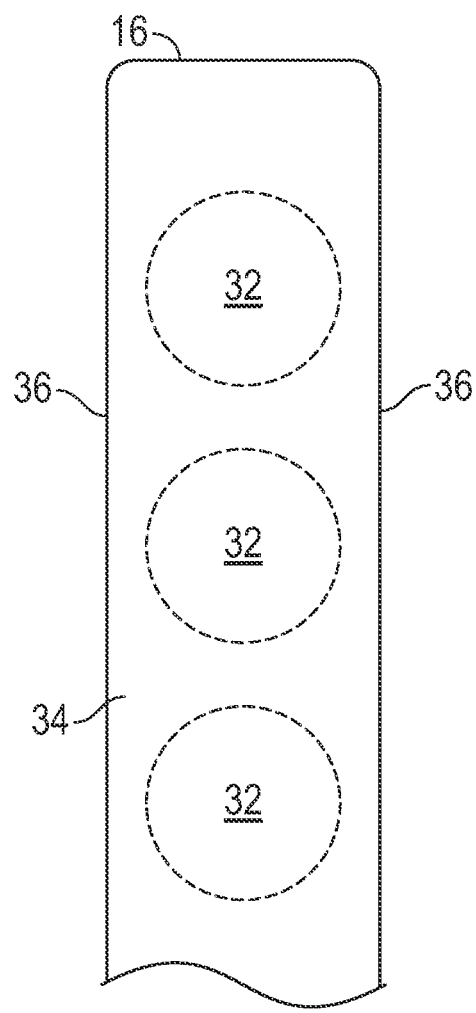
FIG. 2 is a cross-sectional view of an embodiment of an elevator belt.
Figure 3:
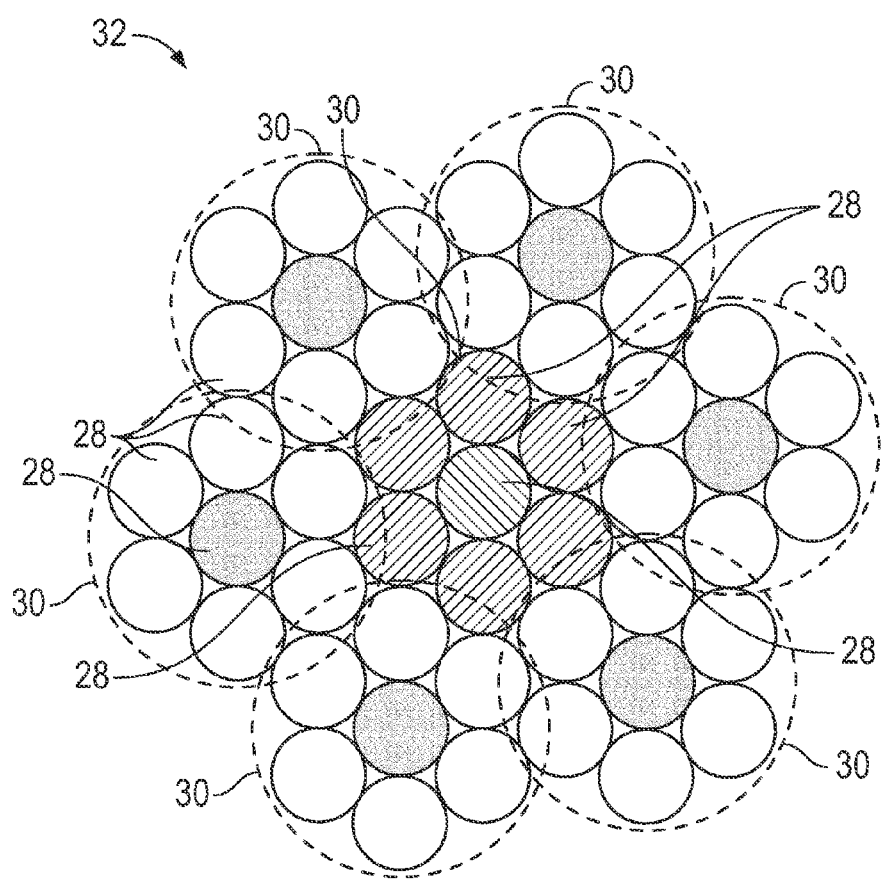
FIG. 3 is a cross-sectional view of an embodiment of a cord for an elevator belt.

FIG. 2 provides a schematic of a belt construction or design. Each belt 16 is constructed of a plurality of wires 28 (e.g. twisted into one or more strands 30 and/or cords 32 as shown in FIG. 3) in a jacket 34. As seen in FIG. 2, the belt 16 has an aspect ratio greater than one (i.e. belt width is greater than belt thickness). The belts 16 are constructed to have sufficient flexibility when passing over the one or more deflector sheaves 18 to provide low bending stresses, meet belt life requirements and have smooth operation, while being sufficiently strong to be capable of meeting strength requirements for suspending and/or driving the elevator car 12 and counterweight 22. The wires 28 may be steel, or formed from other metals or fibers. The jacket 34 could be any suitable material, including a single material, multiple materials, two or more layers using the same or dissimilar materials, and/or a film. In one arrangement, the jacket 34 could be a polymer, such as a thermoplastic elastomer, applied to the cords 32 using, for example, an extrusion or a mold wheel process.

The jacket 34 can substantially retain the cords 32 therein. The phrase substantially retain means that the jacket 34 has sufficient engagement with the cords 32 to transfer torque from the machine 26 through the jacket 34 to the cords 32 to drive movement of the elevator car 12. The jacket 34 could completely envelop the cords 32 (such as shown in FIG. 2), substantially envelop the cords 24, or at least partially envelop the cords 32.

Figure 4:
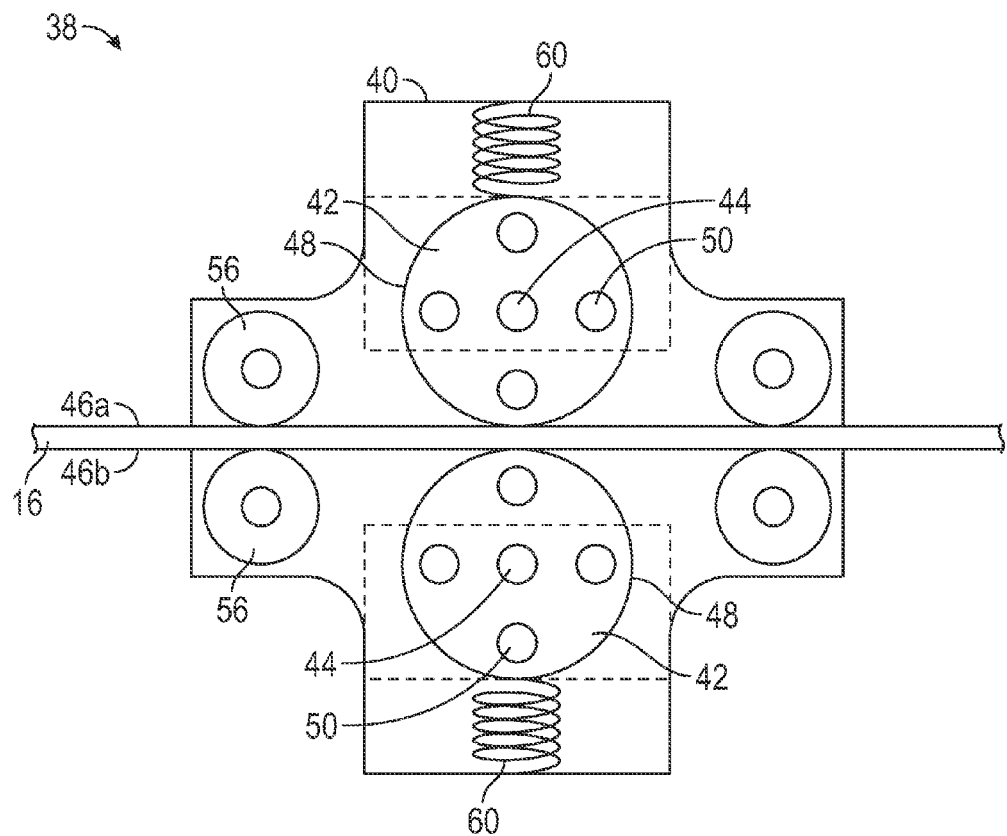
FIG. 4 is a cross-sectional view of an embodiment of a belt resurfacer for an elevator system.

Over time, by operation of the elevator system 10, the jacket 34 wears, altering a surface roughness of an outer surface 36 of the jacket 34. Altering of the surface roughness alters performance of the belt 16, and affects operational characteristics of the elevator system 10 such as noise, vibration and ride quality. To restore an initial surface roughness of the outer surface 36, a belt resurfacer 38, such as that shown in FIG. 4 is utilized. The belt resurfacer 38 includes a resurfacer housing 40 in which the other components of the resurfacer 38 are positioned. Two or more resurfacing rollers 42 are rotatably located in the housing 40, with each resurfacing roller 42 rotatable about a respective roller axis 44. The resurfacing rollers 42 are positioned on opposing sides 46a and 46b of the belt 16, such that the belt 16 is positioned between two resurfacing rollers 42. The resurfacing rollers 42 are formed from a metal or other heat-conductive material, and have a non-stick roller outer surface 48. The roller outer surface 48 is formed to have a surface roughness substantially matching a selected surface roughness of the jacket 34 after refinishing. It is to be appreciated that while two resurfacing rollers are shown in the embodiment of FIG. 4, in other embodiments, the belt 16 may be positioned between one resurfacing roller 42 and another surface, for example a low friction plate or other surface. Such embodiments may be utilized for resurfacing on side of the belt 16 at a time, or in situations where resurfacing of only one side of the belt 16 is desired.

Figure 5:
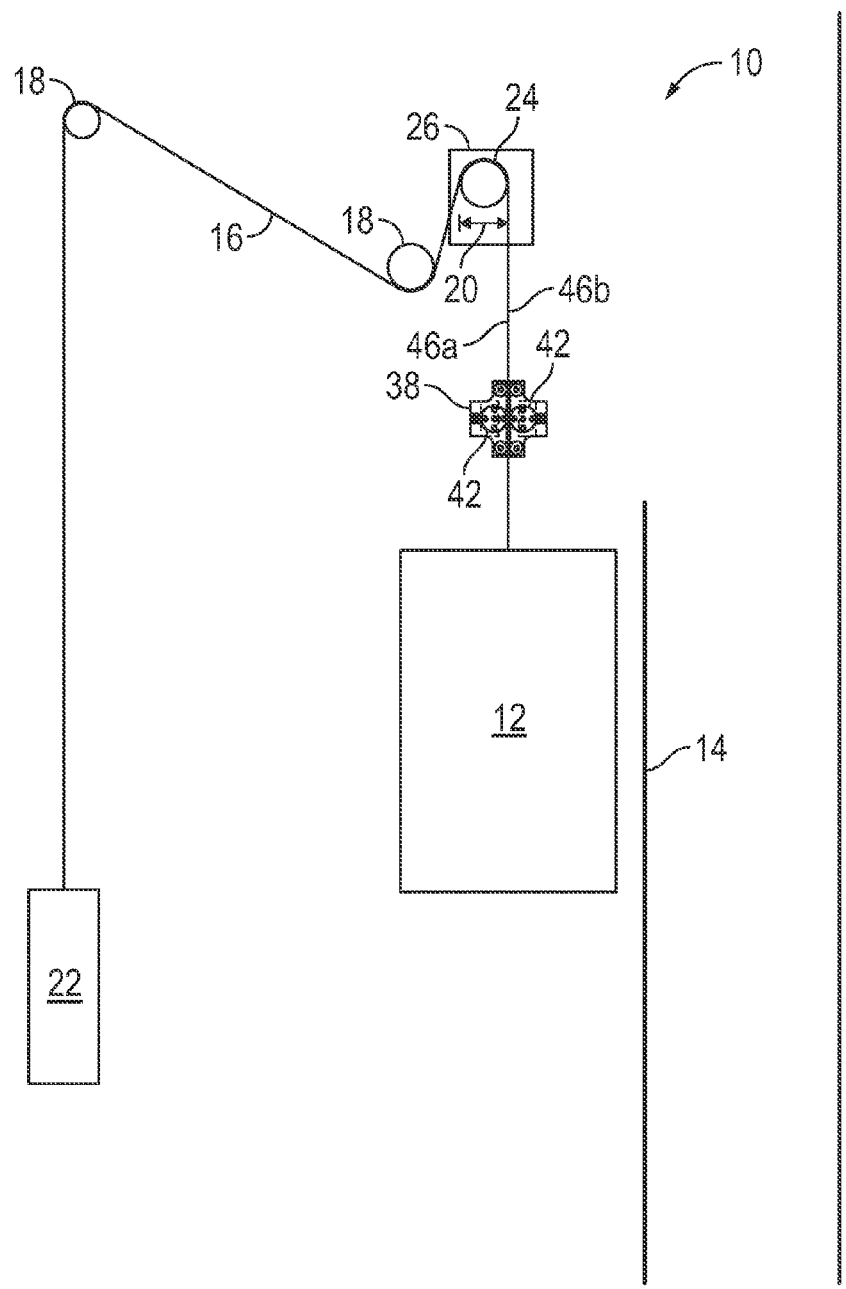
FIG. 5 is a schematic view of an embodiments of a belt resurfacer installed in a hoistway.

To resurface the jacket 34, the belt resurfacer 38 is positioned, as shown in FIG. 5, in the hoistway 14, with the resurface rollers 42 positioned at the opposing sides 46a and 46b of the belt 16. Referring again to FIG. 4, the resurfacing rollers 42 are biased toward the belt 16 by, for example, tensioning springs 60 to apply pressure on the belt 16. In some embodiments, the applied pressure is in the range of 20 to 50 psi. While tension springs 60 are shown in FIG. 4, in other embodiments the pressure may be applied using a pneumatic cylinder, electromechanical actuator or other device. The resurfacing rollers 42 are heated to a temperature below the melting temperature of the jacket 34 material, but a temperature high enough to soften the jacket 34 material. In some embodiments, the resurfacing rollers 42 are heated to a temperature between 140 and 180 degrees Celsius. Alternatively, in other embodiments, the belt 16 may be heated separately from the rollers 42 or before encountering the rollers 42 by, for example, passing the belt 16 through a heater. It is to be appreciated that some jacket materials may require heating to temperatures outside of this exemplary range, depending on the speed at which the belt 16 is routed through the rollers 42 during resurfacing operations. At higher speeds, heating of the belt 16 to higher temperatures may be required to accomplish resurfacing. The resurfacing rollers 42 are heated to the selected temperature by one or more heater rods 50, also known as cal rods, installed in the resurfacing rollers 42. Alternatively a heating coil arrangement installed in the resurfacing rollers 42, or other means, may be utilized to facilitate heating of the resurfacing rollers 42. As shown in FIG. 6, the heater rods 50 are connected to a power source 52 that supplies electrical current to the heater rods 50. A controller 54 connected to the power source 52 regulates the flow of electric current to the heater rods 50, thus maintaining a selected temperature of the resurfacing rollers 42. One or more temperature sensors (not shown) located at the resurfacing rollers 42 may provide temperature feedback to the controller 54.

The belt 16 is moved through the belt resurfacer 38, such that the heated resurfacing rollers 42 soften the outer surface 36 and imprint the surface roughness from the resurfacing rollers 42 into the outer surface 36, with aid from the pressure applied by the tensioning springs 60. Once through the belt resurfacer 38, the outer surface rehardens with the selected surface roughness matching that of the resurfacing rollers 42. In some embodiments, the belt resurfacer 38 includes one or more guide rollers 56 to guide the belt 16 toward the resurfacing rollers 42.

The belt resurfacer 38 disclosed herein allows field repair of a worn belt 16 to improve traction and other operational characteristics of the belt 16 and the elevator system 10. The device and method does not require unroping of the belt 16 from its installed position in the hoistway 14 for resurfacing and thus saves time and labor. Further, the device and method allows for service of a worn belt, thus avoiding premature replacement of the belt.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A resurfacer for a belt for suspending and/or driving an elevator car of an elevator system comprising:
    a resurfacing roller having a selected surface roughness;
    a heater element to heat the belt to a selected temperature; and
    a biasing element to urge the resurfacing roller into contact with the belt, the resurfacing roller applying a selected pressure to the belt;
    wherein applying the resurfacing roller to the heated belt at the selected pressure modifies a surface finish of an outer surface of the belt,
    wherein the resurfacer is configured to be fixed at a hoistway of the elevator system, the belt passes through the resurfacer.

2. The resurfacer of claim 1, wherein the heater element is two or more heater rods disposed in different circumferential locations of the resurfacing roller to heat the belt to the selected temperature.

3. The resurfacer of claim 1, wherein the selected temperature is in the range of 140 to 180 degrees Celsius.

4. The resurfacer of claim 1, wherein the selected pressure is in the range of 20 to 50 psi.

5. The resurfacer of claim 1, wherein the biasing member is a spring.

6. The resurfacer of claim 1, comprising at least two opposing resurfacing rollers.

7. An elevator system comprising:
    a hoistway
    an elevator car disposed in and moveable along the hoistway;
    a motor;
    a traction sheave operably connected to the motor to drive rotation of the traction sheave;
    a belt operably connected to the elevator car, the belt in frictional contact with the traction sheave such that rotation of the traction sheave urges movement of the elevator car in the hoistway; and
    a resurfacer for the belt disposed in the hoistway, including:
        a resurfacing roller having a selected surface roughness;
        a heater element to heat the belt to a selected temperature; and
        a biasing element to urge the resurfacing roller into contact with the belt, the resurfacing roller applying a selected pressure to the belt;
        wherein applying the resurfacing roller to the heated belt at the selected pressure modifies a surface finish of an outer surface of the belt.

8. The elevator system of claim 7, wherein the heater element is two or more heater rods disposed in different circumferential locations of the resurfacing roller to heat the belt to the selected temperature.

9. The elevator system of claim 7, wherein the selected temperature is in the range of 140 to 180 degrees Celsius.

10. The elevator system of claim 7, wherein the selected pressure is in the range of 20 to 50 psi.

11. The elevator system of claim 7, wherein the belt is coated with a thermoplastic elastomer.

12. The elevator system of claim 11, wherein the resurfacer alters the surface finish of the thermoplastic elastomer.

* * * * *